United States Patent
M et al.

(10) Patent No.: US 10,936,620 B2
(45) Date of Patent: Mar. 2, 2021

(54) SYSTEMS AND METHODS FOR MANAGEMENT OF MULTI-PERSPECTIVE CUSTOMER SEGMENTS

(71) Applicant: Flytxt BV, Nieuwegein (NL)

(72) Inventors: Shabana K M, Trivandrum (IN); Jobin Wilson, Ernakulam (IN); Prateek Kapadia, Mumbai (IN); Santanu Chaudhury, Delhi (IN)

(73) Assignee: FLYTXT BV, Nieuwegein (NL)

( * ) Notice: Subject to any disclaimer, the term of this patent is extended or adjusted under 35 U.S.C. 154(b) by 418 days.

(21) Appl. No.: 15/821,637

(22) Filed: Nov. 22, 2017

(65) Prior Publication Data

US 2018/0096052 A1   Apr. 5, 2018

(30) Foreign Application Priority Data

Nov. 22, 2016 (IN) .............................. 201641039900

(51) Int. Cl.
| | |
|---|---|
| *G06F 16/26* | (2019.01) |
| *G06F 16/957* | (2019.01) |
| *G06F 16/332* | (2019.01) |
| *G06F 16/34* | (2019.01) |
| *G06F 16/35* | (2019.01) |
| *G06F 16/906* | (2019.01) |
| *G06F 3/0482* | (2013.01) |
| *G06Q 30/02* | (2012.01) |

(52) U.S. Cl.
CPC ............ *G06F 16/26* (2019.01); *G06F 3/0482* (2013.01); *G06F 16/3323* (2019.01); *G06F 16/345* (2019.01); *G06F 16/358* (2019.01); *G06F 16/906* (2019.01); *G06F 16/9577* (2019.01); *G06Q 30/0204* (2013.01)

(58) Field of Classification Search
CPC ...... G06F 16/283; G06F 16/26; G06F 3/0482; G06F 16/358; G06F 16/906; G06F 16/3323; G06F 16/9577; G06F 16/345; G06Q 30/0204
See application file for complete search history.

(56) References Cited

U.S. PATENT DOCUMENTS 9,584,419 B1 * 2/2017 Gilgur .................... H04L 47/11

OTHER PUBLICATIONS

Lipscomb, Basics of Cladistic Analysis '98, George Washington Unversity, https://www2.gwu.edu/~clade/faculty/lipscomb/Cladistics.pdf.*
Vmirly, Hierarchical clustering: distance threshold #3796 Oct. 23, 2014, github.com, /scikit-learn/scikit-learn/issues/3796.*
(Continued)

*Primary Examiner* — Jason G Liao
(74) *Attorney, Agent, or Firm* — Mannava & Kang, P.C.; Vinay Malik

(57) ABSTRACT

Systems and methods for management of multi-perspective customer segments. This invention relates to customer management, and more particularly to management of customer segments, wherein the customer segments can be multi-perspective. Embodiments herein disclose methods and systems for generating multiple sets of clusterings of customers based on at least one customer attribute, and combining and interactively visualizing the clusterings, to derive insights.

4 Claims, 11 Drawing Sheets

(56) References Cited

OTHER PUBLICATIONS

Manning, Introduction to Information Retrieval 2008, Cambridge University Press, https://nlp.stanford.edu/IR-book/html/htmledition/irbook.html; https://nlp.stanford.edu/IR-book/html/htmledition/divisive-clustering-1.html;https://nlp.stanford.edu/IR-book/html/htmledition/hierarchical-clustering-1.html.*

Journey Into Phylogenetic Systematics, date unknown [captured on Nov. 17, 2015 by archive.org], https://ucmp.berkeley.edu/clad/clad4.html, clad1.html, clad2.html, clad3.html, clad5.html, archive.org version of clad4.html.*

Letunic et al., iTOL date unknown [captured by archive.org on Nov. 6, 2015], itol.embl.de, #, help/help.shtml.*

Interquartile Ranges & Outliers date unknown, Purplemath, https://www.purplemath.com/modules/boxwhisk3.htm.*

UCMP Glossary: Phylogenetics Jan. 16, 2009, ucmp.berkley.edu/glossary/, gloss1phylo.html.*

Duda, Pattern Classification 2nd ed 2001, Wiley & Sons, pp. 1-9, 550-57.*

Ciccarelli et al., Toward Automatic Reconstruction of a Highly Resolved Tree of Life Mar. 3, 2006, Science, vol. 311, pp. 1283-1287.*

1.3.5.11 Measures of Skewness and Kurtosis date unknown (captured on Oct. 4, 2000 by archive.org), NIST, https://web.archive.org/web/20001004034554/https://www.itl.nist.gov/div898/handbook/eda/section3/eda35b.htm.*

M. Mehdi Afsar et al., "Clustering in sensor networks: A literature survey", Journal of Network and Computer Applications 46 (2014), pp. 198-199.

Nam Anh Dao, "Segmentation by Incremental Clustering", International Journal of Computer Applications (0975-8887), vol. 111, No. 12, Feb. 2015, pp. 24-30.

Zhiwei Yang et al., "Navigation Route Based Stable Clustering for Vehicular Ad Hoc Networks", ICST Institute for Computer Sciences, Social Informatics and Telecommunications Engineering 2018, pp. 552-562.

Hui-Chu Chang et al., "Group RFM analysis as a novel framework to discover better customer consumption behavior", Expert Systems with Applications 38 (2011), pp. 14499-14513.

* cited by examiner

SYSTEMS AND METHODS FOR MANAGEMENT OF MULTI-PERSPECTIVE CUSTOMER SEGMENTS

CROSS REFERENCE TO RELATED APPLICATION

This application is based on and derives the benefit of Indian Priority Application 201641039900, the contents of which are incorporated herein by reference.

TECHNICAL FIELD

Embodiments herein relate to customer management, and more particularly to management of customer segments, wherein the customer segments can be multi-perspective.

BACKGROUND

Currently, customer segmentation is performed using a single attribute set. When considering more and more attributes, customers become unique and tend to be very dissimilar to each other. Customers might seem to be unique on all available attributes, but may show multiple groupings while considering subsets of the attributes. For instance, customers with similar demographic might exhibit different buying patterns. A single clustering considering all the attributes might not reveal this insight. Thus an efficient segmentation technique to generate and combine groupings in different feature subsets, representing different perspectives of customer behavior, has to be employed.

Customer segmentation using clustering algorithms such as k-means requires the expected number of clusters ('k') to be specified in advance by the user. However, finding the optimum number of clusters a priori could be very difficult. Incorrectly specifying the value of 'k' would lead to poor clustering results. As such, algorithms that automatically discover natural clusters in customer data without having to specify the number of clusters in advance is advantageous in customer segmentation. Also, during the formation of clusters, the presence of outliers could greatly affect the quality of the final clusters formed. Hence, suitable outlier treatment techniques have to be applied before segmentation to obtain good clustering quality.

A current solution discloses performing a number of independent segmentation strategies on the customers, each strategy resulting in its own set of scores. The sets of scores are then combined to form a composite score for each customer, for generating a ranked list of customers. Such ranked customer lists may be utilized for diverse applications such as running targeted marketing promotions. This technique does not employ any clustering approach based on feature subsets to derive multiple groupings representing various facets of customer behavior. It also does not include any provision to combine, visualize and interactively analyze multiple customer groupings to discover prominent patterns that are scattered across multiple facets of customer behavior. The final segments in this solution are formed solely on the basis of the segmentation scores, rather than through an analysis of various segment characteristics. This can result in groupings based on only one segment characteristic or a single facet of customer behavior.

Objects

The principal object of embodiments herein is to disclose methods and systems for interactively generating multiple sets of clusterings of customers representing multiple perspectives of customer behavior based on at least one customer attribute, followed by combining and visualizing the groupings, to discover prominent patterns that are scattered across multiple facets of customer behavior.

BRIEF DESCRIPTION OF FIGURES

Embodiments herein are illustrated in the accompanying drawings, through out which like reference letters indicate corresponding parts in the various figures. The embodiments herein will be better understood from the following description with reference to the drawings, in which:

FIG. 5 depicts an example cross-tab based visualization that summarizes the segmentation results involving two views, according to embodiments as disclosed herein;

FIGS. 7a and 7b depict an example interactive sunburst diagram with labels mapped to the associated cluster centers, according to embodiments as disclosed herein;

DETAILED DESCRIPTION

Figure 1:
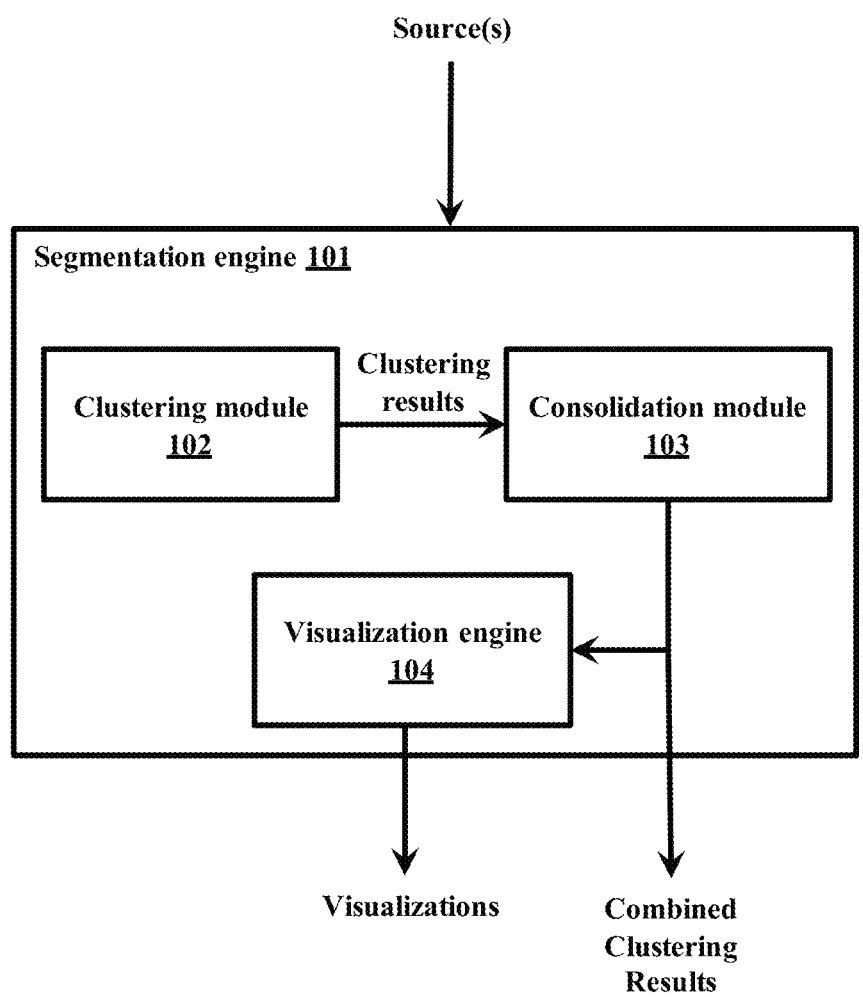
FIG. 1 depicts a system for generating multiple sets of clusterings based on at least one attribute, and combining the clusterings, to derive insights, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for performing customer segmentation by generating multiple sets of clusterings of customers based on at least one customer attribute, and combining the clusterings, to derive insights. Referring now to the drawings, and more particularly to FIGS. 1 through 10, where similar reference characters denote corresponding features consistently throughout the figures, there are shown preferred embodiments.

Embodiments herein disclose methods and systems for generation of multiple sets of clusterings of customers based on subsets of customer attributes (such as demographic attributes, attributes related to purchase data, and so on) constituting views, wherein each view represents an aspect of customer trait/behaviour, Embodiments herein disclose methods for efficiently combining multiple customer groupings and facilitating an interactive user experience to analyze multiple perspectives of customer behavior in order to derive actionable insights. Interactive user experience can be achieved through hierarchical visualization techniques such as sunburst diagrams and tree map, coupled with the multi-perspective segmentation method as disclosed herein.

Embodiments herein have been explained by considering that the data is from subscribers of a telecommunication network, merely as an example. It may be obvious to a person of ordinary skill in the art that the embodiments disclosed herein are independent of the type of data provided.

FIG. 1 depicts a system for generating multiple sets of clusterings based on at least one attribute, and combining the clusterings, to derive insights. The system, as depicted, comprises of a segmentation engine 101. The segmentation engine 101 can be connected to at least one source of data, such as a data server, a file server, a customer database, the Cloud, and so on. The segmentation engine 101 can fetch data from the at least one source, generate multiple clustering solutions based on views defined in the fetched data and produce combined clustering results. The segmentation engine 101 can also produce at least one visualization for the clustered results. The segmentation engine 101 can also store the clustering results in a suitable location such as a database, a data server, a file server, the cloud, and so on. The segmentation engine 101 can further comprise of a clustering module 102, a consolidation module 103, and a visualization engine 104.

The clustering module 102 can define views by grouping relevant segmentation attributes based on at least one customer trait/behavior/attribute to be represented. For example, in the context of a Communication Service Provider (CSP), a usage view could be defined based on attributes (such as outgoing minutes of usage, data usage, SMS (Short Messaging Service) usage, and so on) whereas a profile view could be defined based on attributes (such as subscriber age, average revenue per subscriber, age on network, and so on). In an embodiment herein, the users can define the views. In an embodiment herein, the clustering module 102 can automatically determine the views. The clustering module 102 can use density based approaches to find groupings in different feature subsets. The clustering module 102 can use these groupings to automatically generate views for clustering. The clustering module 102 can use feature subspace selection techniques such as MAFIA for determining the views.

The clustering module 102 can perform outlier treatment automatically for each view through statistical techniques. The clustering module 102 can generate multiple clustering solutions by clustering each view separately. The clustering module 102 can determine the optimal number of clusters in each view automatically, through the use of a non-parametric clustering method. Non-parametric clustering methods, such as DP-means automatically discover the natural groupings (and thus the number of clusters) from data without having to specify the number of clusters in advance. The clustering module 102 can use any traditional clustering method, in case if the user prefers to specify the number of expected clusters.

The consolidation module 103 can combine the multiple groupings of clusters in different views to generate a hierarchical structure. The visualization engine 104 can enable the hierarchical representation of the multiple clustering results in multiple perspectives of customer behavior in arriving at target segments. The visualization engine 104 enables the interactive exploration of the hierarchical structure by enabling the hierarchical structure to be drilled down into segments that are of interest based on the requirements. The visualization engine 104 can provide an interactive onion-peeling experience for visual exploration of the summarized segmentation results using visualization schemes suitable for representation of hierarchical data such as a sunburst diagram, tree-map, and so on.

The segmentation engine 101 comprising of the clustering module 102, the consolidation module 103 and the visualization engine 104 can be a distributed system deployed over multiple computer systems each with its own CPU, memory and hard disk, interconnected by a high speed network.

As an example, consider a scenario where a marketer wants to analyze the usage and recharge behaviors associated with mobile subscribers of various levels of profitability (such as subscribers with high margin, medium margin, low margin, and so on). The marketer first defines three views: revenue view, usage view and recharge view; where the revenue view describes profitability of subscribers and is defined based on attributes such as Margin and Gross ARPU (Average Revenue per User). The usage view describes the service usage behavior of subscribers, and is defined based on attributes such as Outgoing Call Minutes (OG_MOU), SMS Count, Data Usage, STD Contribution and On_net_share. The recharge view describes recharge behavior of subscribers, and is defined based on attributes such as Average Recharge, Count of Recharge, and so on.

Figure 2:
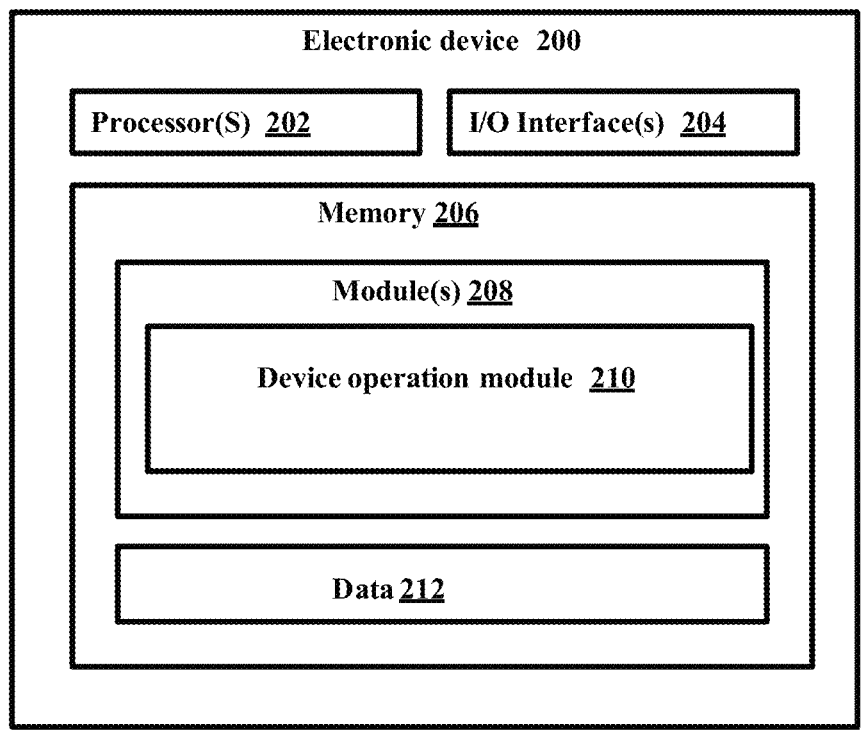
FIG. 2 is a block diagram illustrating a plurality of components of an electronic device 200 for generating multiple sets of clusterings based on at least one attribute, and combining the clusterings to derive insights, according to embodiments as disclosed herein.

FIG. 2 is a block diagram illustrating a plurality of components of an electronic device 200 for generating multiple sets of clusterings based on at least one attribute, and combining the clusterings to derive insights. The device 200 can be any device that can create and manage a digital object layout. Examples of the device 200 can be, but not limited to, a computer, a laptop, a smart phone, a mobile phone, a tablet, a wearable device, a server, the Cloud, and so on.

Referring to FIG. 2, the electronic device 200 is illustrated in accordance with an embodiment of the present subject matter. In an embodiment, the electronic device 200 may include at least one processor 202, an input/output (I/O) interface 204 (herein a configurable user interface), and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces; for example, a web interface, a graphical user interface such as a display screen, a physical interface, and the like. The I/O interface 204 may allow the electronic device 200 to communicate with other devices. The I/O interface 204 may facilitate multiple communications within a wide variety of networks and protocol types, including wired networks, for example, Local Area network (LAN), cable, etc., and wireless networks, such as Wireless LAN, cellular, Device to Device (D2D) communication network, Wi-Fi networks and so on. The modules 208 include routines, programs, objects, components, data structures, and so on, which perform particular tasks, functions or implement particular abstract data types. In one implementation, the modules 208 may include a device operation module 210. The device operation module 210 can be configured to allow the user to handle one or more tasks of the application for decorating and embellishing interstitial space in a digital object layout using one or more embellishments. The device operation module 210 can be configured for generating multiple sets of clusterings based on at least one attribute, and combining the clusterings to derive insights. The device operation module 210 can be configured to execute one or more tasks corresponding to the application on the electronic device 200 in accordance with embodiments as disclosed herein.

The device operation module 210 can define views by grouping relevant segmentation attributes based on at least one customer trait/behavior to be represented. In an embodiment herein, the users can define the views. In an embodiment herein, the device operation module 210 can automatically determine the views. The device operation module 210 can use density based approaches to find groupings in different feature subsets. The device operation module 210 can use these groupings to automatically generate views for clustering. The device operation module 210 can use feature subspace selection techniques for determining the views. The device operation module 210 can perform outlier treatment automatically for each view through statistical techniques. The device operation module 210 can generate multiple clustering solutions by clustering each view separately. The device operation module 210 can determine the optimal number of clusters in each view automatically, through the use of a non-parametric clustering method. The device operation module 210 can use any traditional clustering method, in case if the user prefers to specify the number of expected clusters. The device operation module 210 can combine the multiple groupings in different views to generate a hierarchical structure. The device operation module 210 can enable the hierarchical representation of the multiple clustering results in multiple perspectives of customer behavior in arriving at target segments. The device operation module 210 enables the interactive exploration of the hierarchical structure by enabling the hierarchical structure to be drilled down into segments that are of interest based on the requirements. The device operation module 210 can provide an interactive onion-peeling experience for visual exploration of the summarized segmentation results using visualization schemes suitable for representation of hierarchical data.

The modules 208 may include programs or coded instructions that supplement applications and functions of the electronic device 200. The data 212, amongst other things, serves as a repository for storing data processed, received, and generated by one or more of the modules 208. Further, the names of the other components and modules of the electronic device 200 are illustrative and need not be construed as a limitation.

The memory 206 may include one or more computer-readable storage media. The memory 206 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 206 may, in some examples, be considered a non-transitory storage medium. The term "non-transitory" may indicate that the storage medium is not embodied in a carrier wave or a propagated signal. However, the term "non-transitory" should not be interpreted to mean that the memory 206 is non-movable. In some examples, the memory 206 can be configured to store larger amounts of information than the memory. In certain examples, a non-transitory storage medium may store data that can, over time, change (e.g., in Random Access Memory (RAM) or cache).

FIG. 2 shows exemplary units of the device(s), but it is to be understood that other embodiments are not limited thereon. In other embodiments, the device(s) may include less or more number of units. Further, the labels or names of the units are used only for illustrative purpose and does not limit the scope of the embodiments herein. One or more units can be combined together to perform same or substantially similar function in the device.

Figure 3:
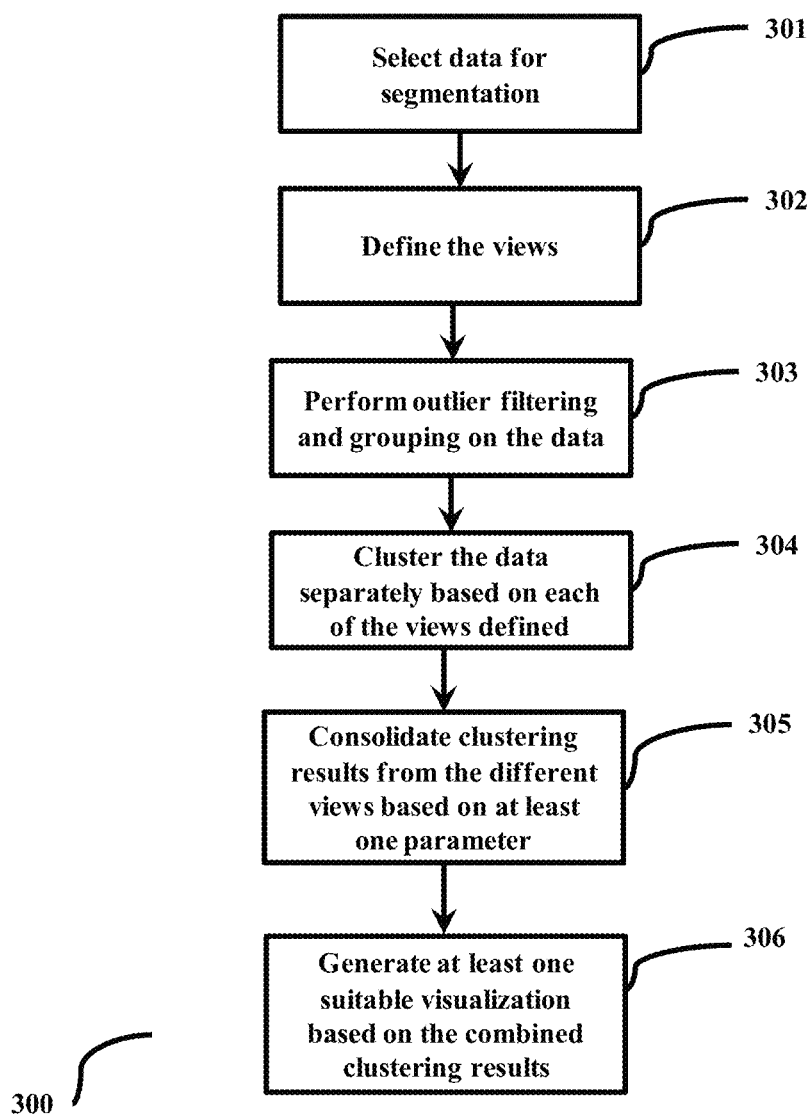
FIG. 3 is a flowchart depicting a process of generating multiple sets of clusterings based on at least one attributes, and combining the clusterings, to derive insights, according to embodiments as disclosed herein.

FIG. 3 is a flowchart depicting a process of generating multiple sets of clusterings based on at least one attribute, and combining the clusterings to derive insights. The clustering module 102 selects (301) the data for segmentation from at least one source and enables (302) the definition of 'n' views, with n>=2, as depicted in an example in FIG. 4. The views can be defined by the user based on subsets of the segmentation attributes or KPIs (Key Performance Indicators), or can be automatically determined by an algorithm. The clustering module 102 can determine the views automatically using feature subspace selection techniques such as MAFIA. These techniques use density based approaches to find groupings in different feature subsets, which are then used to generate views for clustering.

The clustering module 102 performs (303) outlier filtering and grouping on the data for each view based on statistical techniques. This can comprise of the clustering module 102 initially computing the first and third quartile values for each attribute in the data set. For large data sets, the clustering module 102 could perform this by approximating the quartile values from a random sample of sufficient sample size from the data set. For each data point, the clustering module 102 could perform an outlier test based on Inter-Quartile Range (IQR) for each of the view attributes. If an attribute value is more than a pre-defined value (for example, 1.5 IQRs) below the first quartile or above the third quartile, the clustering module 102 can treat the data point as an outlier with respect to that attribute and filter it out. Some data points might exhibit outlier behavior on multiple attributes. Moreover, the clustering module 102 can group a data point with an attribute value, which is the pre-defined value below the first quartile separately from a data point with value, which is the pre-defined value above the third quartile for the same attribute. The clustering module 102 goes through each data point, finds all the attributes on which outlier behavior is exhibited, if any, and labels such data points with the set of these attributes. In order to distinguish between data points with attribute value 1.5 IQRs below the first quartile and 1.5 IQRs above the third quartile, the clustering module 102 can use a negative sign for the attribute in the former case while labeling. The clustering module 102 can replace the attribute labels with numeric labels starting from 1 and are returned along with the filtered data set.

The clustering module 102 clusters (304) the data separately based on each of the views defined. The clustering module 102 can use a non-parametric clustering method that discovers the natural clusters in data, or any traditional clustering method, to cluster the customer data in each of the views. The non-parametric clustering method can use a pre-defined distance 'lambda' that controls the cluster creation process. The clustering module 102 starts with a single cluster, whose mean is the global centroid. The clustering module 102 forms a new cluster whenever a point is farther than 'lambda' away from every existing cluster centroid. The clustering module 102 refines the clusters through multiple iterations, until it converges. After clustering the customers in each view separately, a customer can belong to multiple clusters, one in each view.

The consolidation module 103 consolidates (305) clustering results from the different views based on at least one parameter passed to the module. The parameters can comprise of the visualization scheme to be used for result summary, the ordering of views, and so on. The clustering results are combined based on the specified parameters into a hierarchical structure that could be interactively explored to discover segments of interest to the user. The clusters in each view are represented in each level of the hierarchy. The hierarchical structure makes it possible to recursively analyze the clusters in the multiple views. The clusters in each view can be represented in each level of the hierarchy. The clusters in the first view form the first level of hierarchy. Consider a cluster C' in the first view. Now the customers in C' also belong to some clusters in the other views. Thus, for C', its children in the second level of the hierarchy represent the clusters in the second view to which the customers in C' belong to. This arrangement can be recursively extended to the outer levels of the hierarchy. Such a hierarchical representation makes it possible to interactively drill down clusters in various views to finally discover target segments capturing interesting customer behavior fragmented across multiple views To continue with our example, outliers are filtered from each of the three views—Revenue View, Usage View and Recharge View and clustering is performed separately in each of the three views. A subscriber now belongs to three clusters, one in each view. Next the multiple customer groupings are combined into a hierarchical structure that makes it possible to recursively analyze the clusters in the multiple views. The first level of hierarchy represents the clusters in the first view, for example the Revenue View. The various margin clusters in the subscriber base make up the first level of hierarchy. Now the subscribers in each of the margin clusters also have an associated cluster in the Usage View and Recharge View. Suppose that Usage View makes up the second level of hierarchy. So, the various clusters in the Usage View to which the subscribers in each margin cluster belong to, form the child nodes in the second level of hierarchy for each of the margin clusters. Thus, by selecting a margin cluster, the usage view clusters to which its subscribers belong to could be analyzed. In a similar manner, the third level of hierarchy could be added by considering the cluster memberships of subscribers in the Recharge View. This approach could be extended to arbitrary number of views, providing the ability to discover complex customer behavior patterns, which may not surface by clustering customers by considering attributes across all views simultaneously.

Figure 5:
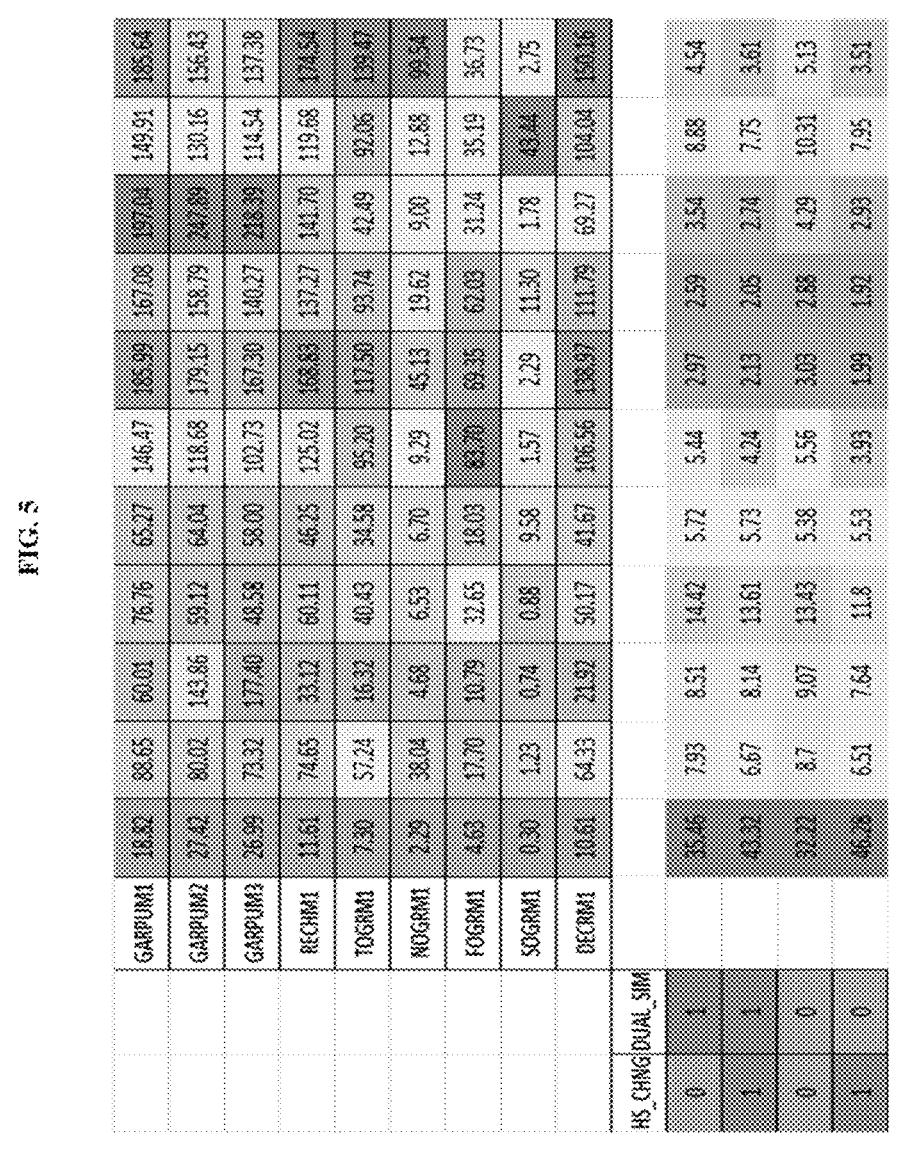

The visualization engine 104 generates (306) at least one suitable visualization based on the combined clustering results and the hierarchical structure, as provided by the consolidation module 103. In an embodiment herein, the visualization engine 104 can use cross-tab based visualization to represent the multiple clustering results when only two views are involved. FIG. 5 depicts an example cross-tab based visualization that summarizes the segmentation results involving two views. Here the rows represent the clusters in one view and the columns represent the clusters in the other view. The cell values denote the number or row/column normalized percentage of customers belonging to the clusters represented by the corresponding row and column. Additional cluster statistics corresponding to each cell could also be visualized.

In an embodiment herein, the visualization engine 104 can use visualization schemes suitable for representing a hierarchical structure in an interactive mode such as a tree-map, sunburst diagram, and so on to visualize the clustering results when two or more views are involved. By default, the views are arranged in the order in which they are defined. The interactive exploration through such a scheme provides an onion peeling experience, whereby a user could iteratively explore the clusters in various views to finally arrive at a segment of interest to him. The clusters in each view can be represented in each level of the hierarchical representation and the area corresponding to each cluster is proportional to the number of customers in that cluster.

The visualization engine 104 can enable an authorized user to interactively modify the hierarchical ordering of the views. Based on the modifications, the segmentation engine 101 can generate at least one updated visualization based on the new hierarchical structure, without re-clustering the data within each of the views.

The visualization engine 104 can enable the user to iteratively interact with at least one visualization based on the combined clustering results and the hierarchical structure generated by the segmentation engine, to discover at least one prominent pattern that is scattered across multiple facets of customer behavior, without re-clustering the data within each of the views.

Figure 4:
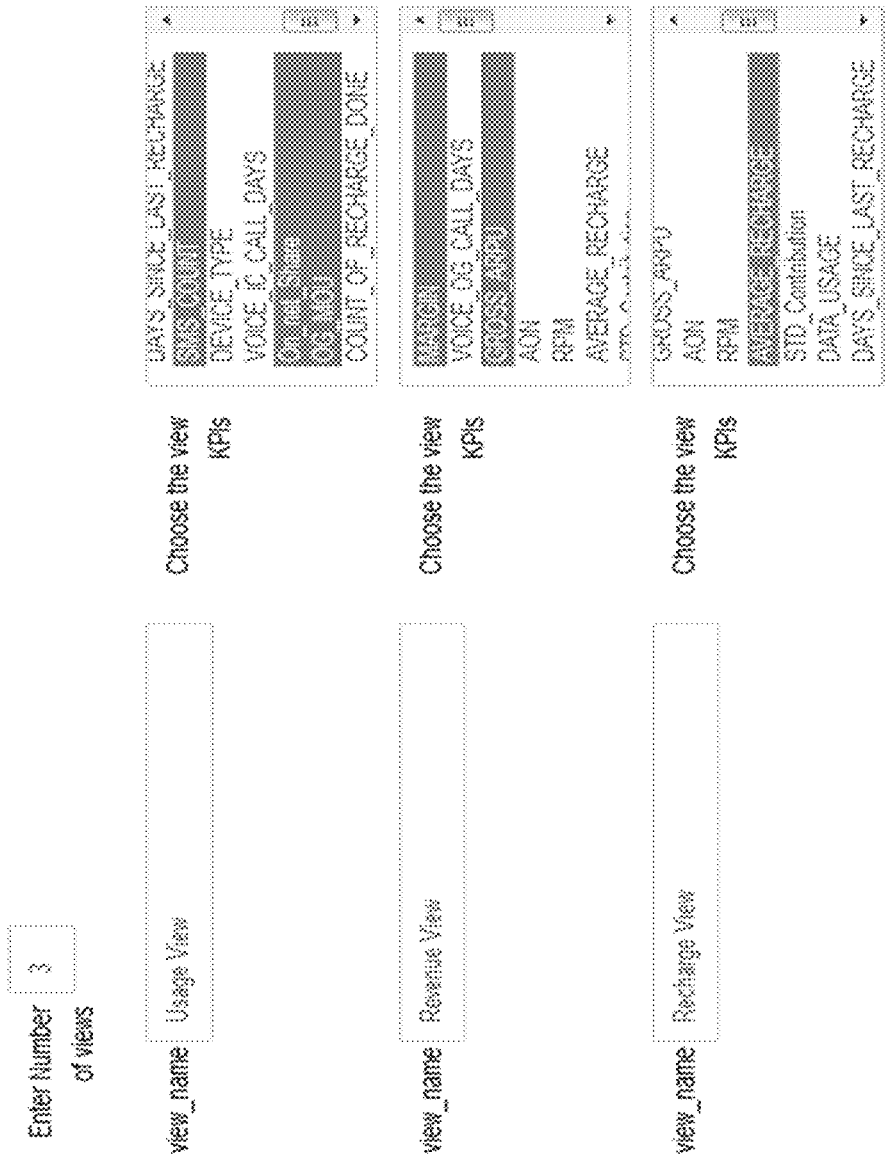
FIG. 4 depicts an example screenshot of the views being defined, according to embodiments as disclosed herein.
Figure 6:
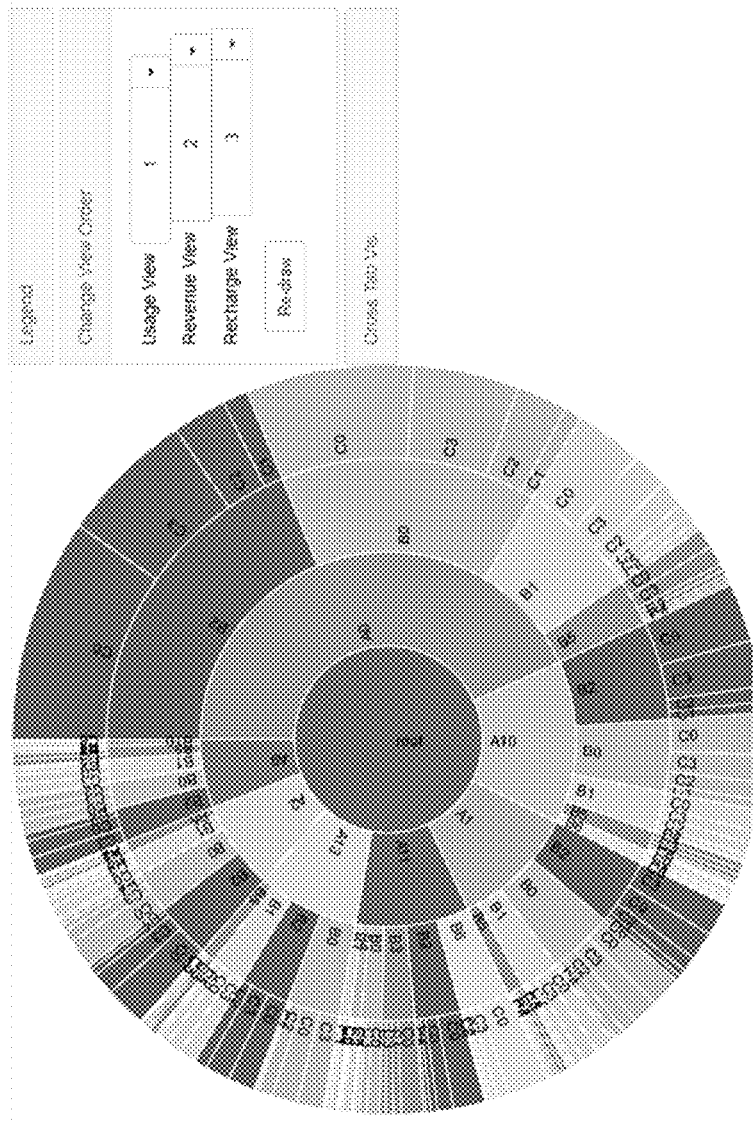
FIG. 6 depicts an example interactive sunburst diagram generated for the view definitions depicted in FIG. 4, according to embodiments as disclosed herein.
Figure 7A:
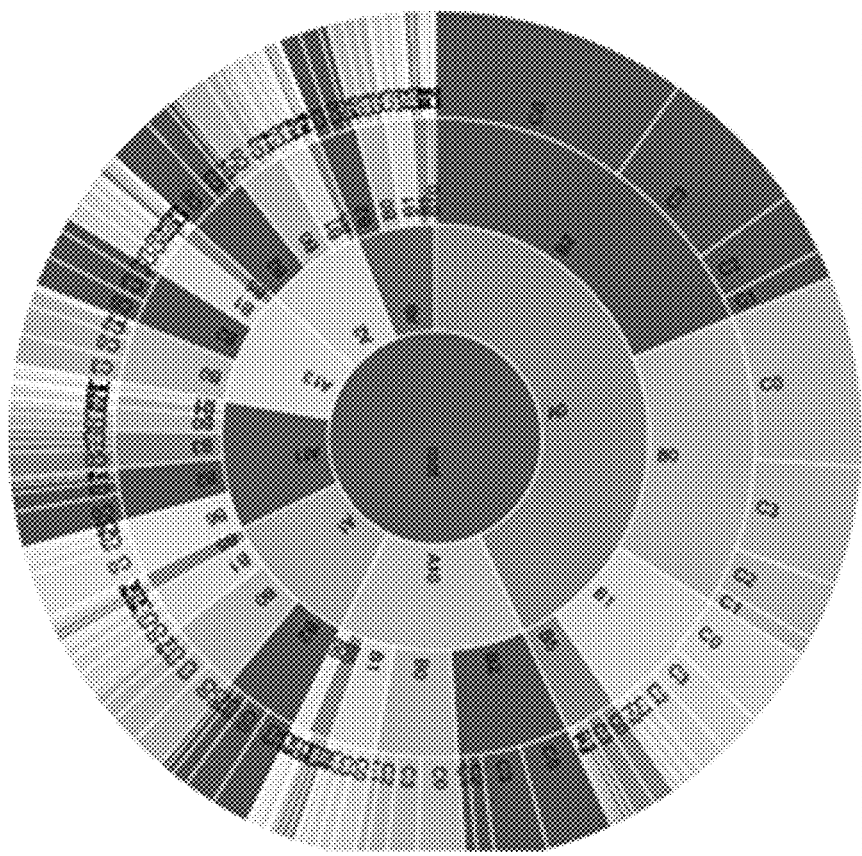
Figure 7B:
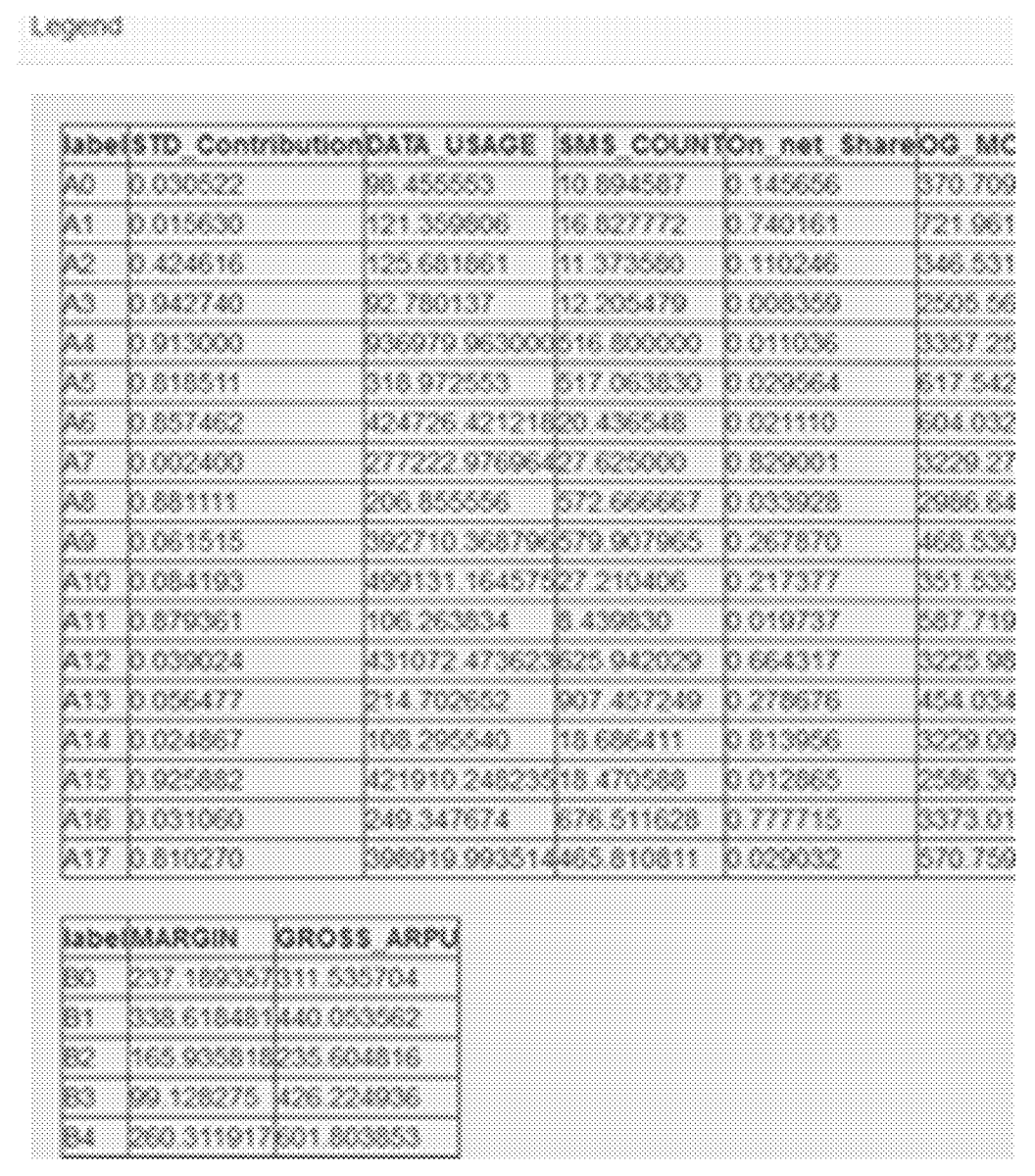

FIG. 6 displays an example interactive sunburst diagram generated for the view definitions depicted in FIG. 4. The ordering of the example views could also be seen from the figure—Usage View, followed by Revenue View and Recharge View. The clusters in the first level have been labeled A0, A1, and so on, the clusters in second level as B0, B1, etc. and so on. The legend provided along with the sunburst visualization maps the labels to the associated cluster centers (as depicted in FIGS. 7a and 7b). Some of the clusters provided in the legend might be missing in the sunburst diagram as they have very few customers assigned to them.

Figure 8:
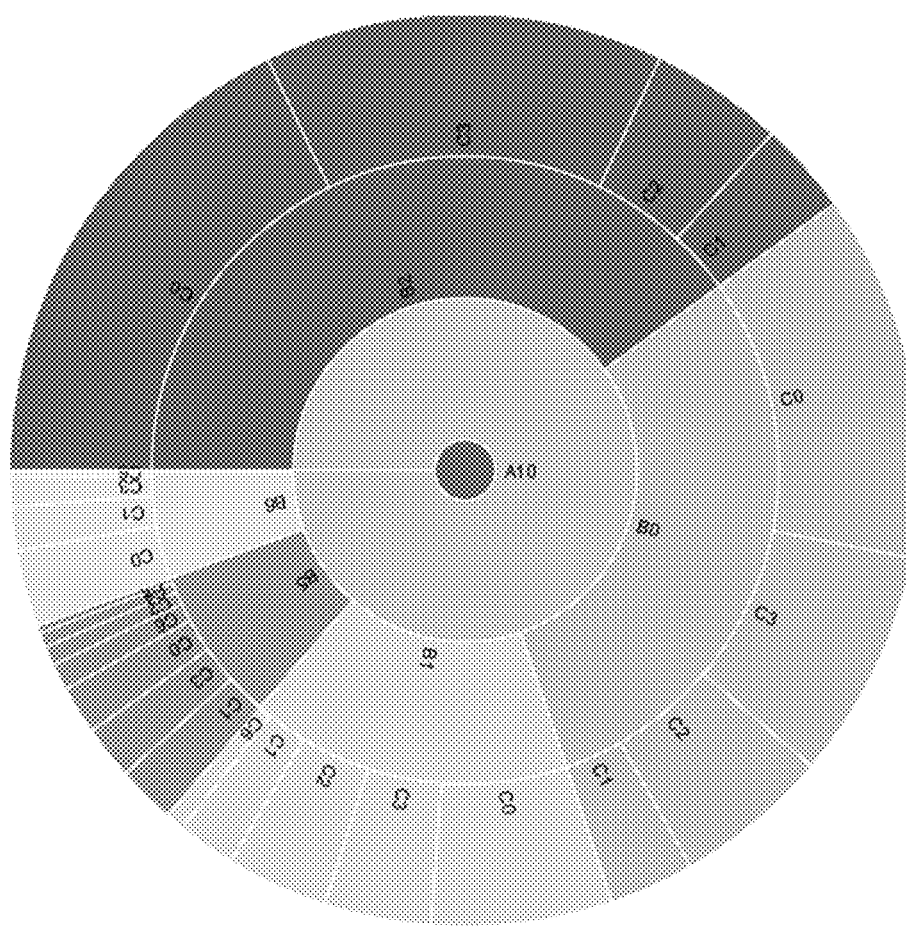
FIG. 8 depicts an example sunburst diagram when the area corresponding to the cluster A10 is clicked, according to embodiments as disclosed herein.
Figure 9:
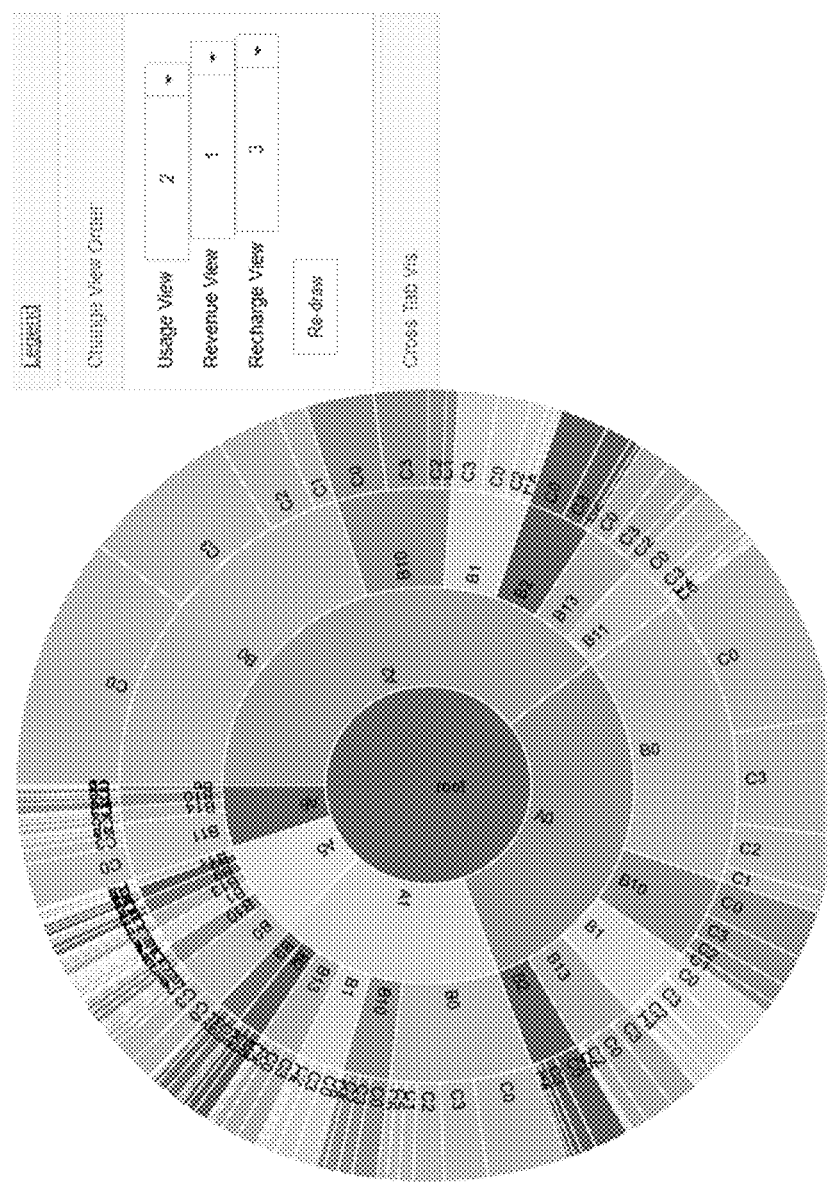
FIG. 9 depicts an example sunburst diagram obtained after re-arranging the views, according to embodiments as disclosed herein.

The interactive nature of the sunburst diagram also makes it possible to zoom into outer layers by following a segment path from the root. FIG. 8 depicts an example sunburst diagram when the area corresponding to the cluster A10 is clicked. Now the sunburst shows the clusters in the second and third views associated with the customers of cluster A10 in the first view. Similarly, any of the clusters in the subsequent views associated with cluster A10 could be analyzed next. Thus, the sunburst diagram could be recursively analyzed to discover segments of interest.

Thus, the marketer in our example is able to analyze the prominent usage patterns associated with subscribers belonging to different margin clusters. By drilling down a level deeper, the various recharge patterns associated with a particular usage behavior could also be studied. Our system thus facilitates a multi-perspective analysis of customer segments by combining different groupings representing various facets of customer behavior.

Figure 10:
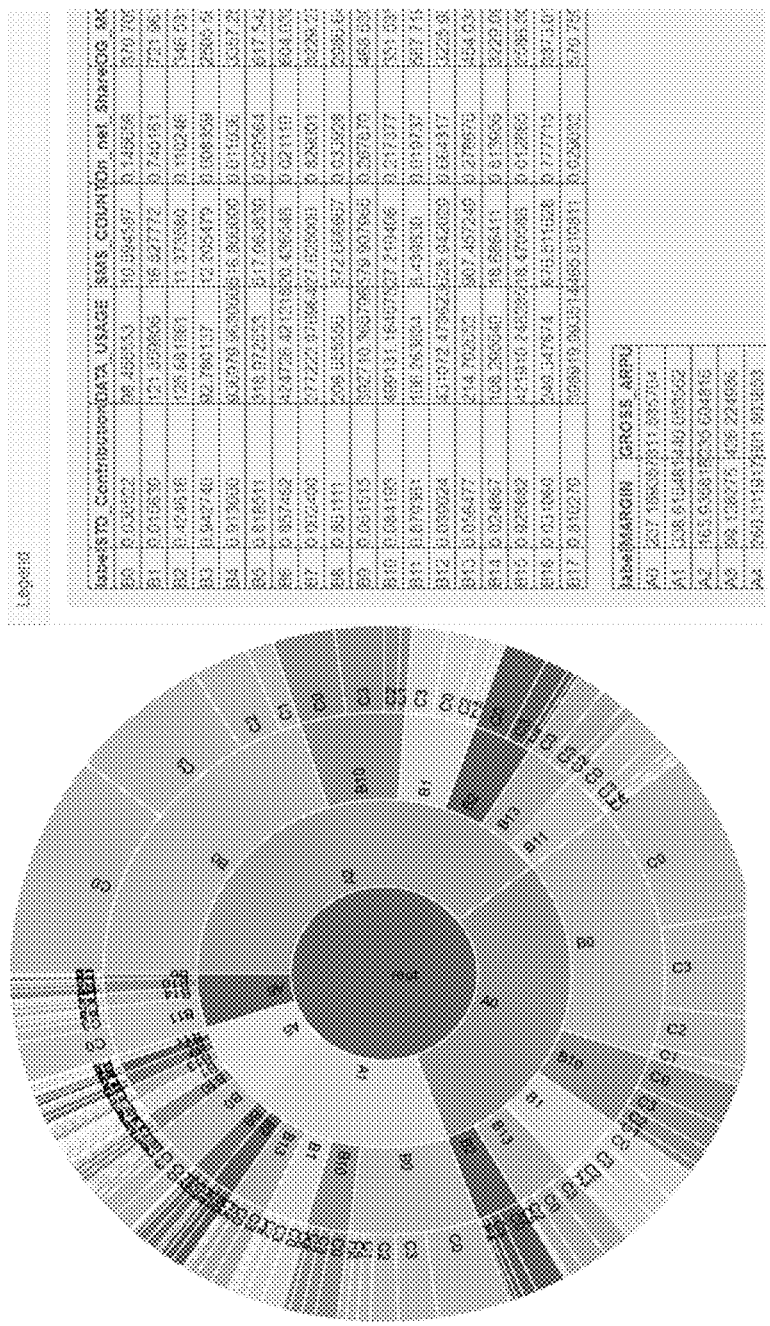
FIG. 10 depicts an example sunburst diagram where the legend displays the new cluster labels after re-arranging the views, according to embodiments as disclosed herein.

The ordering of the views in the sunburst could be varied to enable different types of analyses. As an example, the sunburst diagram obtained after re-arranging the views could be seen in FIG. 9. Here, the innermost level now represents the revenue view clusters, followed by the usage view and the recharge view clusters. Also note that the legend (as shown in FIG. 10) now displays the new cluster labels, even though the cluster labels in the sunburst appear to be unchanged.

The various actions in method 300 may be performed in the order presented, in a different order or simultaneously. Further, in some embodiments, some actions listed in FIG. 3 may be omitted.

Embodiments disclosed herein facilitate customer segmentation by analyzing and integrating multiple perspectives of customer behavior. Traditionally, customer segmentation using clustering algorithms is performed using a single attribute set, preventing it from discovering complex patterns which may be fragmented across multiple facets of customer behavior. However, there may be multiple meaningful natural customer groupings possible if independent subsets of attributes were considered while discovering the clusters. Embodiments disclosed herein enable grouping of customers into multiple segments based on attribute views.

Embodiments herein disclose scalable and efficient methods and systems to combine the multiple customer groupings generated for different views and derive actionable insights through an onion-peeling kind of interactive experience to analyze multiple perspectives of customer behavior.

Embodiments herein enable designing of marketing campaigns taking into account multiple perspectives of customer behavior and readily spot cross sell/upsell opportunities.

The embodiment disclosed herein describes methods and systems for generating multiple sets of clusterings of customers based on at least one customer attribute, and combining and interactively visualizing the clusterings, to derive insights. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A system for generating multiple sets of clusters that are connected through a hierarchical structure from a dataset pertaining to user behaviour, said system comprising
   a processor;
   a memory storing operational instructions which, when executed by said processor, cause the processor to:
   define, using a clustering module, a plurality of views by grouping said dataset based on multiple segmentation attributes of user behaviour;
   perform outlier treatment on said plurality of views to filter out outlier data points that form part of the dataset;
   based on an automatic determination of optimal number of clusters for each of said plurality of views using non-parametric clustering, generate said optimal number of clusters in said each of said plurality of views; and
   in response to generation of said optimal number of clusters in said each of said plurality of views, combine, using a consolidation module, clusters from said plurality of views to generate said hierarchical structure that allows interactive discovery of a pattern of interest through recursive analysis of the clusters across the plurality of views in different feature subsets, wherein the clusters from said plurality of views are represented across different levels of the hierarchical structure in a manner such that if parent nodes of said hierarchical structure are represented by clusters of a first view of said plurality of views, child nodes of each said parent node are formed of clusters having users that are common with users of said respective parent node to avoid re-clustering of data within each of said plurality of views while identifying said pattern of interest, and wherein a first child node is associated with at least two parent nodes.

2. The system of claim 1, wherein said clustering module defines said plurality of views using feature subspace selection.

3. The system of claim 1, wherein said outlier treatment of the said plurality of views comprises:
   computing first and third quartile values for each of said one or more segmentation attributes;
   performing, for each data point of said dataset, an outlier test based on Inter-Quartile Range (IQR) for each of said one or more segmentation attributes such that if data point value for respective segmentation attribute is below first quartile value or above third quartile value of said respective segmentation attribute, said data point is determined to be outlier.

4. The system of claim 1, wherein said optimal number of clusters in said each of said plurality of views are generated by starting with a single cluster whose mean equals global centroid, and iteratively forming a new cluster whenever a data point of said dataset of said view is farther than lambda away from every existing cluster centroid till convergence.

* * * * *